June 15, 1926.
A. FONDO
FASTENING MEANS
Filed April 14, 1925      2 Sheets-Sheet 1
1,589,063
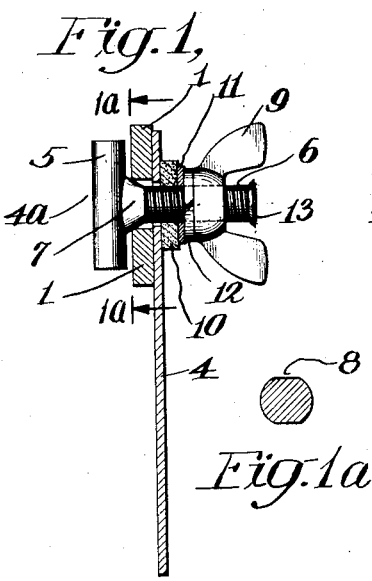
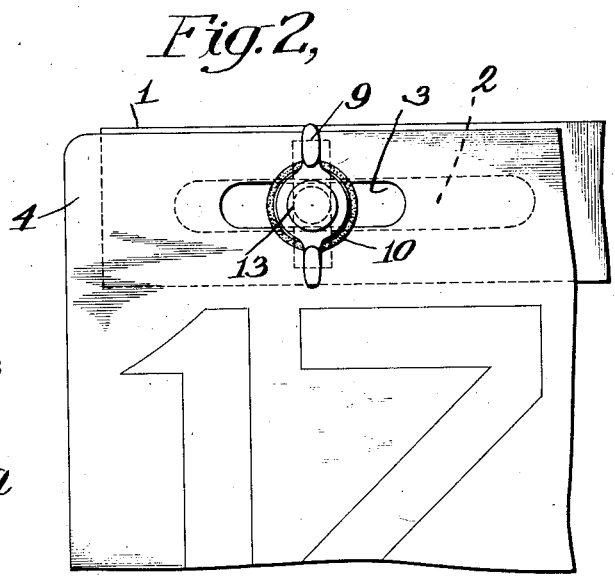
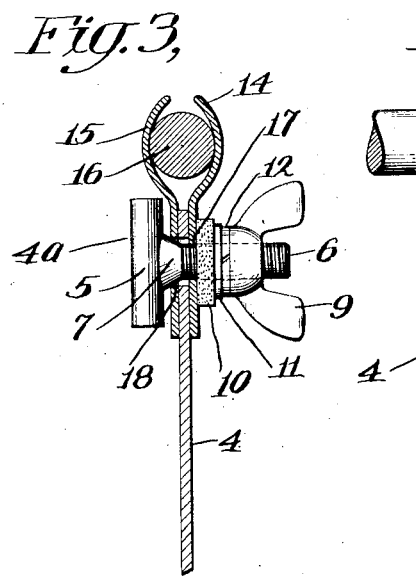
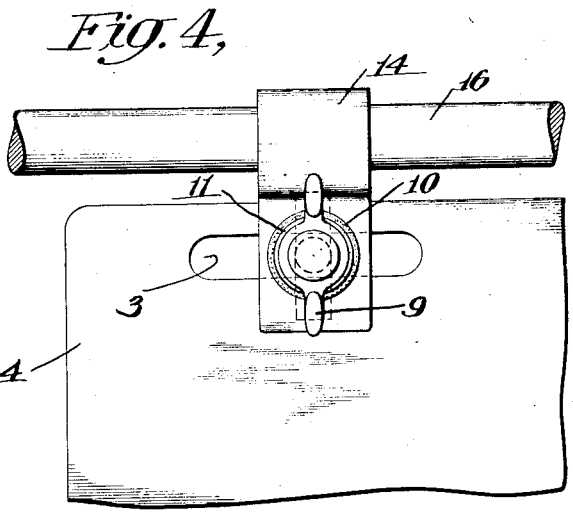
Inventor
Anthony Fondo
By his Attorneys
Ward Crosby & Smith June 15, 1926.
A. FONDO
1,589,063
FASTENING MEANS
Filed April 14, 1925   2 Sheets-Sheet 2
*Fig. 5,*
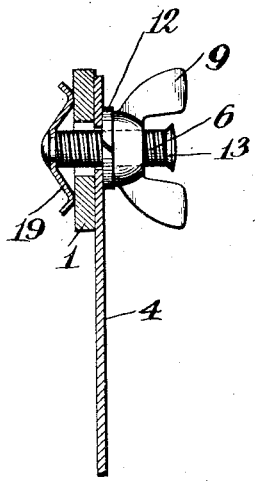
*Fig. 6,*
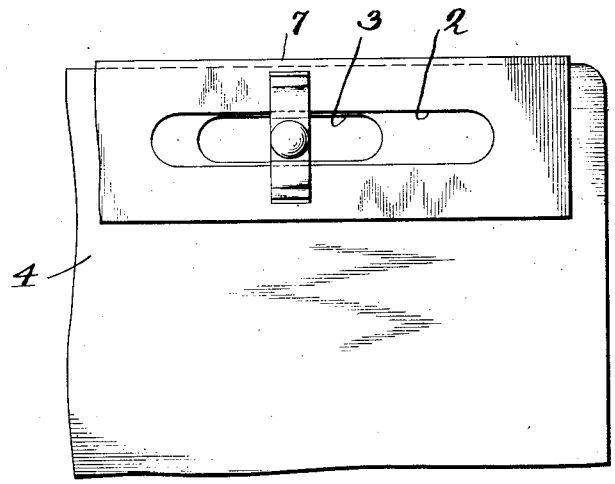
*Fig. 7,*
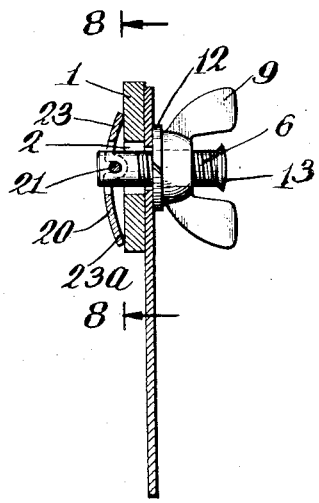
*Fig. 8,*
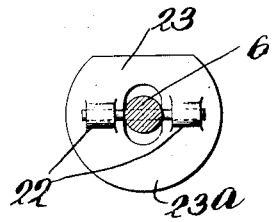
Inventor
Anthony Fondo
By his Attorneys Patented June 15, 1926.

1,589,063

UNITED STATES PATENT OFFICE.

ANTHONY FONDQ, OF HACKENSACK, NEW JERSEY.

FASTENING MEANS.

Application filed April 14, 1925. Serial No. 23,063.

This invention relates to fastening means and more particularly to fastening means for attaching automobile license plates to their respective supporting members.

An object of the invention is to provide means whereby the plate may be easily and expeditiously attached to its supporting member from the front, and without the use of tools of any kind.

Another object is to provide a device of this character which is adapted to rapid and cheap production and which is simple, efficient and durable.

Further objects and advantages of the invention will more fully appear from the following description taken in connection with the accompanying drawings illustrating, by way of example, the preferred embodiment of the invention.

Referring to the drawings:

Fig. 1 is a side view partly in section showing the device in use.

Fig. 1ª is a cross section taken on line 1ª—1ª of Fig. 1.

Fig. 2 is a front view of the parts in Fig. 1.

Fig. 3 is a side view partly in section of another adaptation.

Fig. 4 is a front view of the parts in Fig. 3.

Fig. 5 is a side view partly in section showing a modification of the device in use.

Fig. 6 is a rear view of the parts in Fig. 5.

Fig. 7 is a side view partly in section showing another modification of the device in use.

Fig. 8 is a section taken on line 8—8 of Fig. 7.

Referring to the drawings and more particularly to Figs. 1 and 1ª, 1 represents a supporting member or bracket, a part only of which is shown, provided with a slot 2 adjacent each end and so positioned that it is adapted to be in alignment with slots such as 3, which are formed in the license plate 4 which is to be supported from member 1. The means for attaching a license plate to its supporting member comprises a bolt which will be designated in its entirety as 4ª together with associated parts to be described more fully following. The bolt 4ª is provided with a T head 5 and a threaded shank portion 6, which has a tapered base 7 adjacent the T head and tapering from said T head toward the threaded shank. This tapered base or fillister portion is preferably formed of non-circular cross-section as with plane surfaces such as 8 (Fig. 1ª) whose respective relative horizontal axes converge and whose respective relative vertical axes are parallel to each other and at an angle to the horizontal axis of said head, in the present embodiment being at an angle of 90° to said head. A wing nut 9 is adapted to engage the threaded shank 6. A leather or other somewhat yielding washer 10, a metallic washer 11 and a lock washer 12 are slipped over the shank 6 and then the nut 9 is screwed on the shank until the end of the shank passes therethrough. The end of the shank is then preferably deformed or riveted over, as at 13, to prevent the nut and washer from being lost when the device is not in use. The T head 5 is of a length less than the length of either of the slots 2 or 3 and is of a width less than the width of either of the slots 2 or 3. The tapered base 7, at its maximum diameter is of a diameter greater than the width of the slot 2 and at its minimum diameter is of a diameter less than the width of the slot 2.

The device in its assembled condition is applied in the following manner. The license plate is positioned, as shown, with its slots 3 in registration with the slots 2 in the supporting member 1, the T head is inserted through the slots 2 and 3 in a position parallel thereto and, when it has been passed through a sufficient distance, is turned at an angle thereto, preferably 90°. It is then pulled back until the tapered plane surfaces 8 come into abutting engagement with the sides of the slot 2 and the nut is then screwed down. The plane surfaces 8 prevent the bolt 4ª from turning, and upon screwing down the nut 9, the tapered base is slightly forced into the member 1 which further prevents the bolt 4ª from turning. The T head in this position, prevents the bolt from being withdrawn through the slot 3 and the license plate is thus firmly held against its supporting member, between the wing nut 9 and T head 5.

A modification of the device is shown in Figs. 3 and 4 wherein the bolt 4ª, the nut 9 and washers 10, 11 and 12 are identical with the corresponding parts of the device shown in Figs. 1 and 2 except that the end of the shank 6 is not riveted over. In this embodiment the two arms 14 and 15 are provided with concave end portions adapted to engage the supporting member 16, and are adapted to partially surround a portion of the member 16 when clamped in position. The member 14 is provided at its lower end with a hole 17 adapted to substantially fit the shank 6 and the arm 15 is provided at its lower end with a hole 18 which is of a diameter greater than the hole 17 and smaller than the maximum diameter of the tapered base 7, but greater than the minimum diameter of the tapered base 7. In applying this modified device the arms 14 and 15 are positioned on the opposite side of the license plate 4, with the arm bearing the smallest hole, on the front side of the plate. The bolt 4ª is now inserted from the rear passing through the arm 15, the license plate 4 and the other arm 14; the washers 10, 11 and 12 are now placed over the shank 6 and the nut 9 is screwed on to the shank. The license plate together with the assembled fastening device is now placed in position adjacent the supporting member 16 with the arms 14 and 15 lying adjacent the front and rear sides respectively of the member 16. The nut 9 is now screwed on the shank 6 until the upper ends of the arms 14 and 15 firmly engage the supporting member 16 to thereby hold the license plate in firm suspension therefrom; the tapered base 7 of the bolt preventing the latter from turning in opening 18 of arm 15.

Another modification is shown in Figs. 5 and 6, wherein instead of the T head 5, as shown in Figs. 1 and 2, a resilient head 19 is fastened to one end of the shank 6 as by riveting and is preferably formed of spring steel. The head member 19 is of a width less than the width of either of the slots 2 or 3, and of a length less than the length of either the slots 2 or 3 and greater than the width of either of the slots 2 or 3. This member is bent inwardly from its central portion and the ends are bent outwardly thereby forming a resilient member. In this modification, the washer 12 and the nut 9 are assembled with the bolt member. After the washer and nut have been placed on the shank, the head of the shank is preferably riveted over, as at 13. In placing this device in operative position, the license plate is placed in proper position with respect to the supporting member 1, the head 19 is passed through the slots 2 and 3 and the bolt is turned so that the head is disposed at an angle to the slots. The bolt is then pulled back until the resilient force of the spring head 19 exerts sufficient friction to prevent the bolt from turning; and while still in this position the nut 9 is screwed down to a degree sufficient to cause considerable flexure of the head 19. This exerts a constant resilient force which acts to firmly hold the license plate against its supporting member, and prevents the bolt from turning.

Another modification of the fastening device is shown in Figs. 7 and 8, wherein in place of the head 19, as described in connection with Figs. 5 and 6, a dished washer 20 is attached to the end of the shank 6 by means of pin 21 which passes through the shank 6 adjacent its end and engages suitable pintle bearing portions 22 formed in the washer 20, these pintle bearing portions are of a width equal to or less than the diameter of the bolt shank 6 and the overall length from outside to outside is less than the length of the slot 2. This washer is preferably made of resilient material such as spring steel and is so formed that one side such as the lower side 23ª (Fig. 7) is heavier than the upper side. The washer 12 and nut 9 are placed in position on the shank 6 and the nut of the shank is preferably riveted over, as at 13. In placing this device in operation the license plate is placed in position, as described above, the member 20 is swung about its pivot pin until the top side 23 lies against the shank 6. The bolt, head end first, is passed through the holes 2 and 3 until the portion 23 of the head has passed the outer face of the member 1. In this position the lower end of the head, due to its greater relative weight, will fall downwardly, positioning the head in its operative position as shown in Fig. 7; the bolt is then pulled back until the hinge or bearing portions 22 lie within the slot 2, in which position the bolt will be held from rotating by means of the engagement of the hinge portions 22 with the side walls of the slot 2. The nut 9 is now tightened down until the head 20 is under considerable tension. The resilient properties of the head 20 serve to firmly hold the bolt and its associated nut 9 in this position, and the plate is firmly held against its supporting member.

It will be seen, after understanding the foregoing, that this device is adapted to be applied without the use of any tools. This is a very great advantage since the member 1 is usually positioned in close proximity to other parts, and tools may be used only at a great disadvantage, due to the limited space between the supporting member and its adjacent parts. In using this device, it is not even necessary to place one hand behind the supporting member 2, since the entire operation of attaching the license plate by means of this device may be accomplished from the front of the member 1.

While I have described my invention in detail and with respect to preferred embodiments thereof, I do not desire to be limited to such details and embodiments since many changes and modifications may be made and the improvements embodied in widely different forms without departing from the spirit and scope thereof in their broader aspects.

Hence I desire to cover all modifications and forms coming within the language or scope of any one or more of the appended claims.

What I claim as new and desire to secure by Letters Patent, is:

1. A fastening device for attaching a license plate to a supporting member provided with a slot of relatively greater length than width, comprising a T head bolt with an integral threaded shank, adapted to pass through a hole in said license plate, said shank having a tapered base of non-circular cross-section adjacent said head and tapering from said head toward said shank, and a nut adapted to cooperatively engage said threaded shank, whereby when said T head is passed through said slot and turned out of alignment therewith it may not be withdrawn therethrough, and when said shank is passed through the hole in said license plate and said nut screwed down on said shank, said tapered base will be forced into said slot and will provide a positive lock against the rotation of said T head bolt.

2. A fastening device for attaching a license plate to a supporting member provided with a slot of relatively greater length than width, comprising a T head bolt with an integral threaded shank, adapted to pass through a hole in said license plate, said shank having a tapered base adjacent said head tapering from said head toward said shank and having substantially plane surfaces whose respective relative horizontal axes converge and whose respective relative vertical axes are parallel to each other and at an angle to the horizontal axis of said head, and a nut adapted to cooperatively engage said threaded shank, whereby when said T head is passed through said slot and turned out of alignment therewith it may not be withdrawn therethrough, and when said shank is passed through the hole in said license plate and said nut screwed down on said shank, said tapered base will be forced into said slot and will provide a positive lock against the rotation of said T head bolt.

3. A fastening device for attaching a license plate, provided with a slot of relatively greater length than width, to a supporting member provided with a slot of relatively greater length than width, comprising a T head bolt, the head of which is of less width than the width of either slot and is of greater length than the width of the slot in said member, provided with a threaded shank, said shank having a tapered base adjacent said head and tapering from said head toward said shank, and a nut adapted to cooperatively engage said shank, said shank being deformed after said nut is screwed on to thereby prevent the nut from falling off before the device is placed in use, whereby when said T head is passed through said slots and turned out of alignment therewith it may not be withdrawn therethrough.

4. A fastening device for attaching to a perforated supporting member a license plate or the like article provided with a slot, comprising an integral bolt head and threaded shank, said bolt head joining the threaded shank by a fillister portion having at least one flattened surface area inclined to the shank, and threaded clamping means cooperating with said shank for clamping the plate to the supporting member when said shank is inserted through the perforation in the supporting member and the slot in the plate, said flattened inclined fillister portion then serving to bring the perforations into alignment with the slot and to prevent turning of said shank within the slot.

5. A fastening device for attaching a license plate to a supporting member provided with a slot of relatively greater length than width, comprising a T head bolt with an integral threaded shank joining the bolt head by a fillister portion having at least one flattened inclined surface area, and threaded clamping means cooperatively engaging said threaded shank whereby when said T head is passed through said slot and through the plate and turned out of alignment with the slot it may not be withdrawn therethrough, said flattened inclined fillister portion serving as a wedge for bringing the plate into predetermined alignment with the slot and to prevent turning of said shank when the plate is clamped to the supporting member.

In testimony whereof I have signed my name to this specification.

ANTHONY FONDO.